United States Patent
Filous et al.

(10) Patent No.: US 6,844,912 B2
(45) Date of Patent: Jan. 18, 2005

(54) OPTICAL SYSTEM FOR THE ROTATION OF IMAGES TAKEN BY A FILM CAMERA ABOUT THE OPTICAL AXIS

(75) Inventors: Pavel Filous, Guntramedorf (AT); Walter Trauninger, Lamb im Wald (AT); Michael Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 10/296,825
(22) PCT Filed: May 16, 2001
(86) PCT No.: PCT/DE01/01909
§ 371 (c)(1), (2), (4) Date: Nov. 25, 2002
(87) PCT Pub. No.: WO01/90786
PCT Pub. Date: Nov. 29, 2001

(65) Prior Publication Data
US 2003/0137582 A1 Jul. 24, 2003

(30) Foreign Application Priority Data
May 23, 2000 (DE) .......................................... 100 27 371

(51) Int. Cl.[7] ........................... G03B 41/02; G02B 27/10
(52) U.S. Cl. ....................................... 352/105; 359/625
(58) Field of Search ............................... 352/105, 106, 352/110; 359/625

(56) References Cited

U.S. PATENT DOCUMENTS

| | | | |
|---|---|---|---|
| 3,945,713 A | 3/1976 | Doi et al. | |
| 4,192,591 A | 3/1980 | Yobaccio | |
| 4,427,269 A | 1/1984 | Lang et al. | |
| 4,529,276 A | 7/1985 | Yamada | |
| 4,868,588 A | 9/1989 | Hajnal | |
| 5,469,236 A | 11/1995 | Roessel | |
| 5,648,867 A | 7/1997 | Hellriegel et al. | |
| 5,677,763 A | 10/1997 | Redmond | |
| 6,259,563 B1 * | 7/2001 | Eckerl | 359/625 |

FOREIGN PATENT DOCUMENTS

| | | | |
|---|---|---|---|
| DE | 24 36 230 A1 | 2/1975 | |
| DE | 30 46 626 A1 | 7/1982 | |
| DE | 32 45 477 A1 | 6/1983 | |
| DE | 195 05 944 A1 | 4/1996 | |
| JP | 09145541 A * | 6/1997 | G01M/11/00 |

OTHER PUBLICATIONS

International Search Report of PCT/DE01/01909, dated Dec. 11, 2001.

International Preliminary Examination Report of PCT/DE01/01909, dated Sep. 3, 2002.

English Translation of International Preliminary Examination Report of PCT/DE01/01909, dated Sep. 3, 2002.

* cited by examiner

Primary Examiner—Judy Nguyen
Assistant Examiner—Arthur A Smith
(74) Attorney, Agent, or Firm—Christie, Parker and Hale, LLP

(57) ABSTRACT

The invention relates to an optical system for the rotation of images taken by a film camera about an optical axis, having a controller device for the rotation of images with an adjusting motor and a position sensor for recording the rotation angle of the image-rotating optical system. In addition, the possibility of displacing the optical system in at least one axial direction is provided.

26 Claims, 4 Drawing Sheets

OPTICAL SYSTEM FOR THE ROTATION OF IMAGES TAKEN BY A FILM CAMERA ABOUT THE OPTICAL AXIS

CROSS-REFERENCE TO RELATED APPLICATION

This application is a National Phase Patent Application of International Application Number PCT/DE01/01909, filed on May 16, 2001, which claims priority of German Patent Application Number 100 27 371.8, filed May 23, 2000

FIELD OF THE INVENTION

The invention relates to an optical system and more specifically to an optical system for the rotation of images taken by a film camera about an optical axis.

BACKGROUND OF THE INVENTION

From DE 24 36 230 A1 an optical system is known for the rotation of images in a recording lens system for television cameras, movie film cameras and photographic cameras. The optical system contains a prism which serves for the rotation of the image and which is mounted between a forward lens and a rear lens of a relay-lens system, as well as a field lens which is mounted on a first focusing plane on which an image is created through an objective lens. The field lens has a focal distance such that the pupil of the relay-lens system conjugated to the opening of the objective lens can be arranged in the centre point of the beam path of the prism which is serving for the rotation of the image.

From DE 3245 477 A1 an optical system is known for image rotation which has a projection lens system for creating an image in a predetermined plane, a prism for image rotation rotatable about the optical axis of the projection lens system, and a slit element for screening light which is mounted between the projection lens system and the prism and which is rotatable with the rotation of the prism about the optical axis.

The use of an optical system of this kind for image rotation in conjunction with a film camera means that when an image rotation is required it is no longer necessary to rotate the entire film camera about the optical axis so that the film camera can be operated as normal and the eyepiece as well as all operating elements of the film camera remain in their standard position. The use of standard lenses and standard accessories is thereby guaranteed and these can be fitted on hand-held systems or on systems fixed to the body of the cameraman.

From U.S. Pat. No. 4,427,269 a method and device are known for automatically compensating the image rotation through an articulated optical system which consists of members with lenses for the optical representation as well as articulated joints with mirrors or prisms for deflecting the beam path. In order to compensate the image rotation when the articulated optical system rotates a signal is generated whose polarity is dependent on the direction of rotation of the image produced in an observation plane relative to an object. From this signal a compensation element mounted in the beam path of the articulated optical system is controlled and actuated until the signal disappears. The compensation element consists of an optical element for image rotation formed as a Dove prism and mounted inside one tube of the several interconnected tubes of the articulated optical system and connected through gearing to a motor mounted outside of the tube and controlled by a servo booster.

The servo booster receives a signal from a signal processor which is connected to a sensor mounted on the observation plane and on which an image is depicted of markings arranged inside or outside an intermediate image. If this marking deviates from a predetermined neutral position then the sensor produces a signal which leads through the signal processor and the servo booster to control the motor which through the gearing turns the optical element for compensating the image rotation until the image marking is again located in the neutral position.

From U.S. Pat. No. 5,677,763 an optical measuring and viewing device is known with which physical and optical characteristics of an object are measured by means of a device for image rotation which can consist of a Dove prism, a Pechan prism or a mirror assembly and the measured beams are sent to a one-dimensional CCD element. The image-rotating optical element is mounted inside a tube which is supported through ball bearings on a housing on which a drive motor is fixed which is connected through a drive belt to the image-rotating optical element. Additional optical elements such as planar concave lenses, aperture and a planar convex lens are mounted outside of the tube but inside the housing of the optical measuring and viewing device and are fixedly connected to same.

The aforementioned U.S. Pat. No. 4,427,269 and U.S. Pat. No. 5,677,763 specification are directed more particularly to the needs for compensating image rotations in an articulated optical system and for measuring the outlines of an object. The demands on an optical system for rotating recorded images of a film camera differ quite considerably from this.

One requirement of an optical system of a film camera is the light intensity of the optical system used, for only with an optical system having a high light intensity can satisfactory film shots be produced even with high-speed films and under unfavourable lighting conditions. A further requirement for an optical system of a film camera lies in its simple handling which is also to include minimal size and easy assembly and dismantling. Furthermore in order to produce special effects when filming, extremely high dynamics of the optical system have to be guaranteed so that inter alia the so-called "stroboscopic effects" can be achieved, i.e. special effects which are connected with a sudden change of the position of the horizon line. Extremely high dynamics of this kind require special mechanical measures in order to keep the moved masses slight and to ensure a direct force or torque transfer.

SUMMARY OF THE INVENTION

The object of the invention is therefore to integrate an image-rotating optical system in the picture system of a film camera without reducing the optical performance of the picture system, which has an extremely fine adjustment and very high optical system dynamics, and which takes up less structural space and ensures minimal noise development.

The solution according to the invention makes it possible to integrate an image-rotating optical system into the picture system of a film camera without reducing the optical performance of the picture system and which has a highly accurate adjustment and very high optical system dynamics which takes up minimal structural space, ensures a high operating comfort and high adjusting speeds during image rotation with a minimal level of noise.

Through the direct rigid connection of a ring-shaped drive motor and a position sensor with the image-rotating optical system no mechanical play occurs and due to the absence of a mechanical gearing means the noise level is significantly reduced. Furthermore the structural space required is less than in an arrangement with drive motors arranged externally and eccentrically relative to the optical system. Through the direct installation of a ring-shaped drive motor about the image-rotating optical element no external and eccentric forces are introduced into the optical system which could lead to a reduction in the optical performance, for example preventing centering of the optical system.

In particular the image-rotating optical system is suitable for continuously rotating pictures taken about the optical axis.

An advantageous development of the solution according to the invention is characterised in that the rotationally mounted optical element consists of a rotatable prism, preferably a Schmidt-Pechan prism and/or a mirror assembly.

The image rotation and/or alignment of the images taken can take place selectively through a prism or through several mirrors aligned corresponding to each other and rotatable about the optical axis, or through a combination of rotatable prisms and rotatable mirrors.

In particular the optical system has in the direction of the recording beam path a field lens or a field lens system, the rotatable prism and/or the rotatable mirror assembly, a transmission lens and a fixed prism or a fixed mirror assembly.

Furthermore the transmission lens can include a relay optic or a double Gauss lens.

A further development of the solution according to the invention is characterised in that the optical system for the rotation of images taken about the optical axis is mounted between a lens carrier and a recording lens of the film camera wherein the optical system for the rotation of the recorded images about the optical axis has a forward and rear fastening flange for connecting the optical system to the recording lens and to the lens carrier of the camera housing.

By arranging the rear fastening flange of the optical system between the transmission lens and the fixed prism it is possible to arrange the fixed prism at least in part inside the camera housing so that a corresponding shortening and integration of the optical system in the film camera is possible.

In an advantageous development of the solution according to the invention an iris aperture is mounted in the image-rotating optical system between the transmission lens and the fixed prism and can be operated from the housing side of the optical system.

By means of a device adjusting at least a part of the optical elements of the image-rotating optical system it is possible to adapt the image-rotating optical system to different recording lenses so that lenses can also be used whose exit pupils have pupil positions which differ strongly from each other, such as for example zoom lenses.

Since in particular zoom lenses have the property that in most embodiments the exit pupil position changes severely when changing the focal width, it is advantageous to carry out an adaptation of the optical system to different focal widths. This can be undertaken during operation for example through a corresponding adaptation of a field lens system.

An adjusting device can also include for example a field lens or a field lens system being mounted and fixed in the optical system so that the field lens or at least a part of the field lens system can preferably be exchanged from the side of the front fastening flange.

With an interchangeable field lens or a part-interchangeable field lens system there is the possibility of making use of lenses with sharply differing pupil positions outside of the operation of the film camera.

A further adjusting device consists in the rotatable prism or the rotatable mirror assembly suspended with a cardan joint in the housing of the optical system and adjustable in at least two planes. In addition to tilting, the rotatable prism or the rotatable mirror assembly can be displaced in at least one axial direction, i.e. in the direction of the optical axis and/or perpendicular thereto.

For this purpose the rotatable prism is fixed in a prism chair which is mounted in a prism holder for swivel movement about a first axis, and the prism holder is mounted in a prism shaft connected to the ring-shaped drive motor for swivel movement about a second axis which is preferably arranged perpendicular to the first axis. The prism shaft can be disposed inside a distance sleeve for the bearing of the rotatable prism whilst the distance sleeve is mounted inside a tube and the tube is surrounded by a cover of the housing of the optical system.

Preferably the first and second axis consist of bolts wherein the bolts forming the first axis are arranged diametric relative to each other, are mounted rotatable in the prism shaft and are connected to the prism holder, whilst the bolts forming the second axis are arranged diametric relative to each other and are mounted perpendicular to the bolts of the first axis and are mounted in the prism holder and connected to the prism chair.

In order to adjust the bolts and thus the position of the rotatable prism an opening for adjusting the bolts is disposed in the housing of the optical system or in the tube and in the prism shaft.

A further advantageous development of the solution according to the invention is characterised in that the housing of the optical system is connected through a connecting element to support tubes or rods fixed on the camera housing wherein the connecting element contains in particular a control electronics unit connected to the signal sensor and the ring-shaped drive motor.

By connecting the control electronics for evaluating the position sensor signals and for controlling the ring-shaped control motor of the optical system for the image rotation to the control electronics of the film camera it is in particular possible to synchronise the rotation of the image-rotating optical system with the film transport. In particular the rotation of the image-rotating optical system can be carried out in the transport phase of the moving film.

By using a motorised drive for rotating the image-rotating optical system it is possible not only to reach very high adjusting speeds but also adjusting movements synchronised with the film camera in the transport phase of the moving film. Therefore it is possible to undertake a change in the horizon line of the film camera between the exposure of successive individual images whereby the direct installation of the drive in coaxial form means that no external and eccentric forces are introduced into the system which could lead to a reduction in the optical performance.

In particular the control electronics of the film camera can issue a release signal to the control electronics during the transport phase of the moving film to control the adjusting motor of the image-rotating optical system so that an image rotation is always then possible when the recording beam path is interrupted during the transport phase of the moving film.

BRIEF DESCRIPTION OF THE DRAWINGS

The idea on which the invention is based will now be explained in further detail with reference to the embodiment illustrated in the drawing in which.

DETAILED DESCRIPTION

Figure 1:
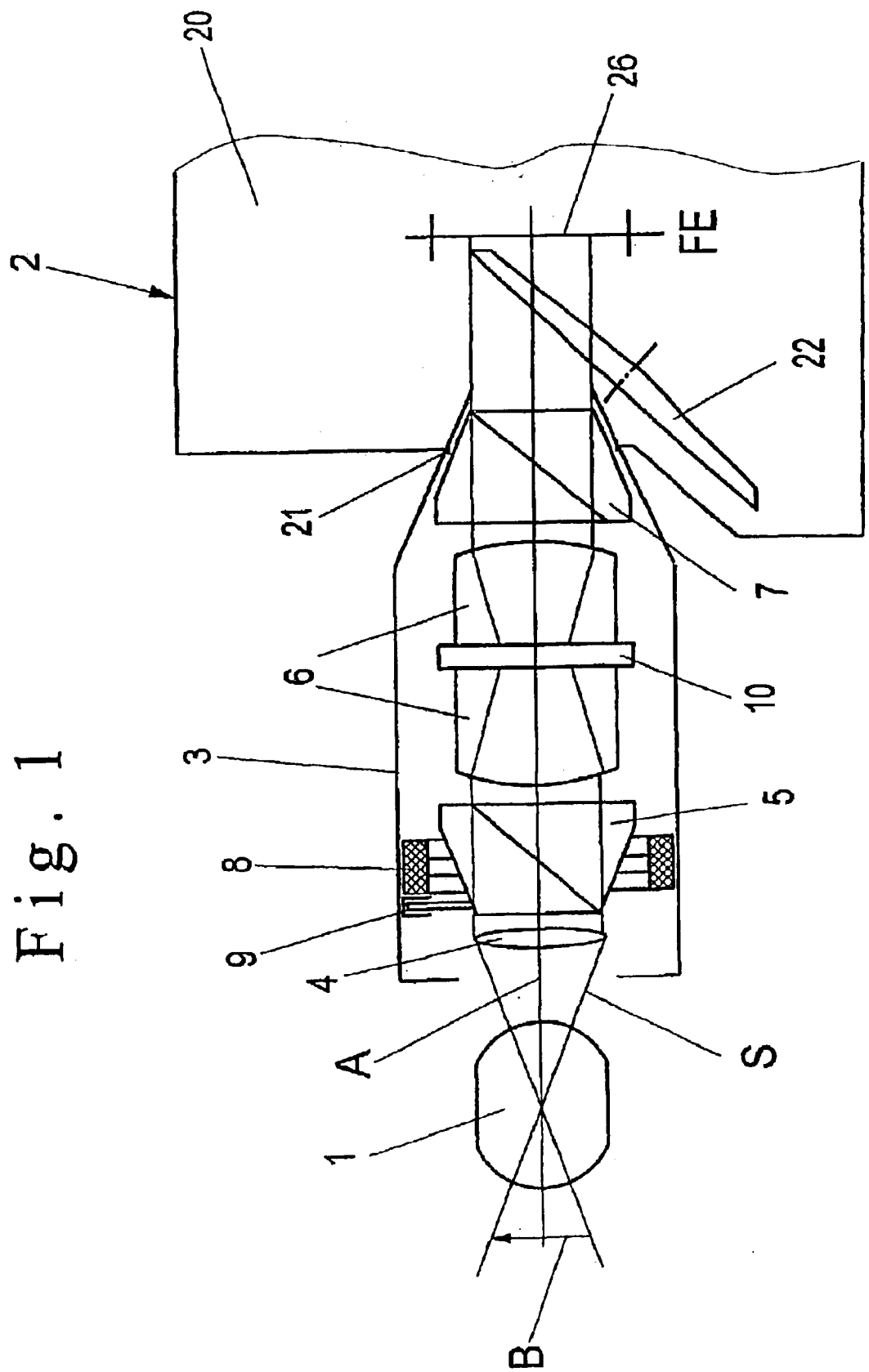
FIG. 1 shows a diagrammatic view of the basic construction of an image-rotating optical system mounted between a recording lens and a film camera.
Figure 2:
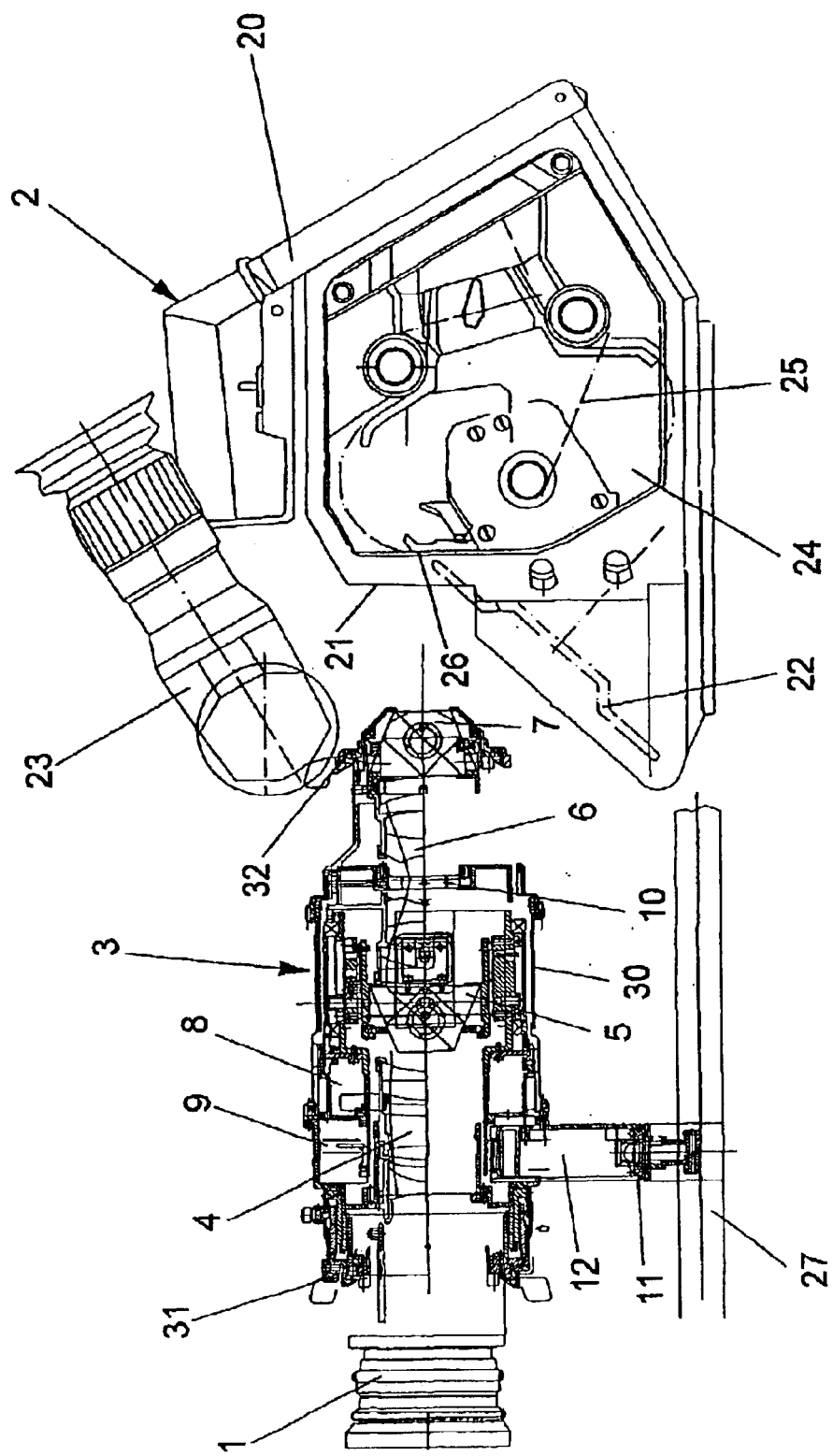
FIG. 2 shows a detailed view of the arrangement according to FIG. 1.
Figure 3:
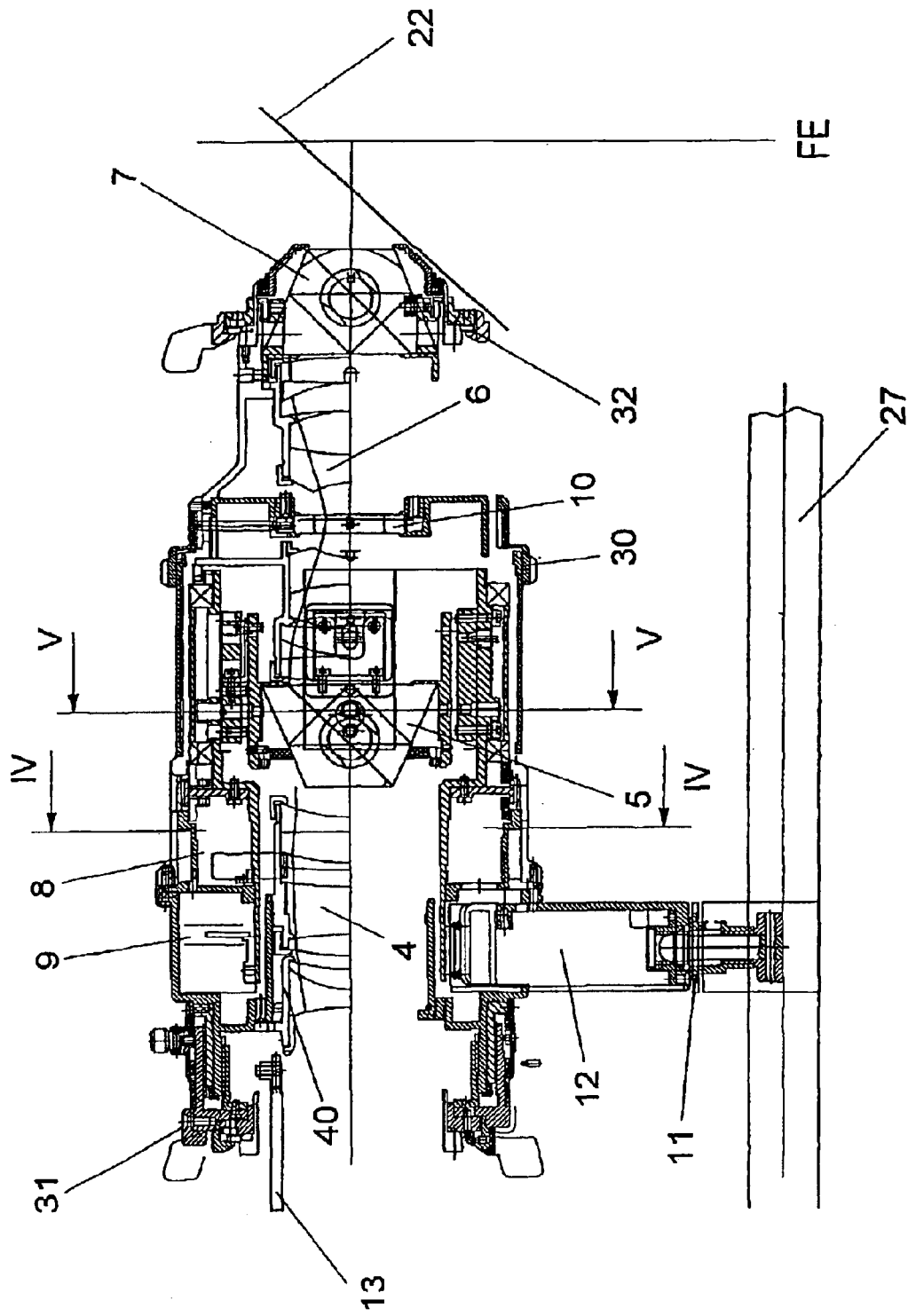
FIG. 3 shows a detailed view of an image-rotating optical system.

The basic construction of an image-rotating optical system 3 mounted between a recording lens 1 and a film camera 2 and shown diagrammatically in FIG. 1 has in the direction of the recording beam path behind the recording lens 1 a field lens which in a preferred embodiment according to FIGS. 2 and 3 is designed as a field lens parcel.

In the recording beam direction behind the field lens there is a rotatable prism 5 which can consist for example of a Schmidt-Pechan prism. The rotatable prism 5 is connected to an adjusting motor 8 which consists of a ring-shaped drive motor for the rotation of the rotatable prism 5 about the optical axis A. In order to detect the relevant rotational angle of the rotatable prism 5 relative to a reference position there is a position sensor 9 which consists for example of an optoelectronic position sensor with a high resolution of the angle degrees to be detected.

As an alternative to the rotatable prism or in combination with a rotatable prism it is possible to use a mirror assembly with several mirrors aligned relative to each other and arranged in a corresponding rotational device.

In addition to the rotation or tilting of the rotatable prism or the rotatable mirror assembly there is also the possibility of displacing the rotatable optical system in at least one axial direction, i.e. perpendicular to the optical axis or in the direction of the optical axis.

In the recording beam direction behind the rotatable prism 5 or the rotatable mirror assembly there is a relay optic 6 which can include for example of a double Gauss lens. The closure of the image-rotating optical system 3 is formed by a fixed prism 7, for example likewise a Schmidt-Pechan prism. Inside the camera housing 20 there is a rotatable mirror aperture 22 which interrupts the recording beam path during the film transport so that the individual film images of the moving film are moved intermittently to a picture window 26 which is located in the film plane FE and are released for exposure after release of the recording beam path through a cut-out section of the mirror aperture 22.

As can be seen from the diagrammatic illustration in FIG. 1 the image-rotating optical system 3 is connected to a lens carrier 21 of the camera housing 20 of a film camera 2 so that the fixed prism 7 projects into the camera housing 20 of the film camera 2 where it is restricted in regards to its arrangement through the rotating mirror aperture 22 of the film camera 2.

As can be seen from the detailed illustrated in FIG. 2 the camera housing 20 of the film camera 2 contains a lens carrier 21 for fixing replacement lenses or image-rotating optical system 3 and in the optical axis of the recording lens 1 there is a picture window 26 set in the camera housing 20 past which a moving film 25 is intermittently moved. For this purpose the film camera 2 contains a film transport mechanism 24 with a gripper switch mechanism as well as toothed rollers for unwinding and feeding back the film 25 in a camera cassette which is to be connected to the camera housing 20.

A rotating mirror aperture 22, connected to the film transport mechanism through an aperture motor or gearing and driven by same, releases the film recording beam path entering through the recording lens 1 and image-rotating optical system 3 periodically as a film exposure beam path for exposure of a film image of the film 25 standing in the picture window 26, or reflects the film recording beam path during the film transport as a reflected beam path to a beam divider from which a viewfinder beam path branches off to a viewfinder eyepiece 23 and where necessary a video beam path branches off to a video recording appliance or CCD-video chip or to other image viewing or processing devices connected to the film camera.

The beam path S entered in the basic construction of the optical system 3 according to FIG. 1 shows that the recording lens 1 focuses an image to be taken in a first plane on which a field lens 4 or the focusing plane of a field lens packet is mounted in order to converge the beams coming from the recording lens 1. By means of the rotatable prism 5 which is mounted behind the field lens 4 the beams are brought into the relevant desired image position and converged in the double Gauss lens 6 towards an iris aperture 10 and then passed on diverging to the fixed prism 7 from where an image is projected in the plane of the picture window 26 when the cut-out section of the rotating mirror aperture 22 releases the recording beam path for taking an image on the movie film 25.

In the detailed illustration according to FIG. 2 as well as in the enlarged view of the image-rotating optical system 3 according to FIG. 3 it can be seen that the recording lens 1 is connected through a front fastening flange 31 to the image-rotating optical system 3 which is connected through a rear fastening flange 32 to the lens carrier 21 of the film camera 2.

Of the field lens packet 4 the front lenses combined together with a holder 40 can be exchanged for different groups of recording lenses and can be adapted to different beam paths. Furthermore the interchangeable field lenses adapt to the exit pupil positions of the different recording lenses and ensure an optimum light distribution since different recording lenses can lead to considerable brightness differences over the image surface and thus to a considerable loss of quality.

The front lenses of the field lens packet 4 combined together with the holder 40 can be removed by means of a tool 13 from the front side of the image-rotating optical system 3 and replaced by a lens system of a different refraction. The ease of interchanging the front lenses of the field lens packet 4 means that it is easily possible to adapt to the exit pupil positions of different recording lens with optimum light distribution in particular as a result of the easy access to the front lenses from the front side of the image-rotating optical system 3.

Inside a tube 30 of the image-rotating optical system 3 there is a ring-shaped drive motor 8 which is connected directly to the mounting of the rotatable prism 5. A position sensor 9 detects the relevant position of the rotatable prism 5 in relation to a reference angle position and sends the relevant position to an electronics unit 12 which is mounted in a connecting element 11 which can be connected to support rods or tubes 27 which are fixed on the camera housing 20. The connecting element 11 thereby exerts at the same time a supporting and fixing function for the optical system 3. Control signals are sent from a control electronics unit 12 to the ring-shaped drive motor 8 for rotating the rotatable prism 5.

By connecting the control electronics unit 12 to the camera electronics unit the adjusting movements of the rotatable prism 5 are synchronised with the transport of the recording film 25. This synchronisation is carried out so that during the film transport, that is in the phase in which the revolving mirror aperture 22 covers the recording beam path to the picture window 26 and the film is transported intermittently on by one image by means of the film transport mechanism 24, an adjusting movement of the rotatable prism 5 and thus a change of the horizon line of the recorded images are carried out.

Before the end of the film transport and release of the film picture to be exposed through the rotating mirror aperture 22 the adjusting movement of the rotatable prism 5 is also terminated so that for successive individual images a corresponding change of a horizon line can be carried out. As a result of the motorised adjustment of the rotatable prism 5 very high adjusting speeds can be reached so that in many cases an adjustment of the horizon line of the rotatable prism 5 can be undertaken within one individual transport step of the moving film 25.

Figure 4:
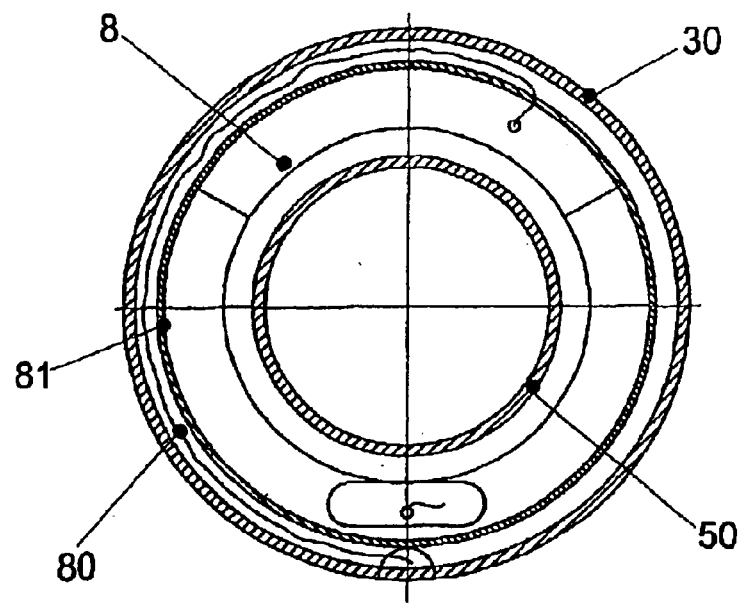
FIG. 4 shows a section through the optical system according to FIG. 3 along the line IV—IV.
Figure 5:
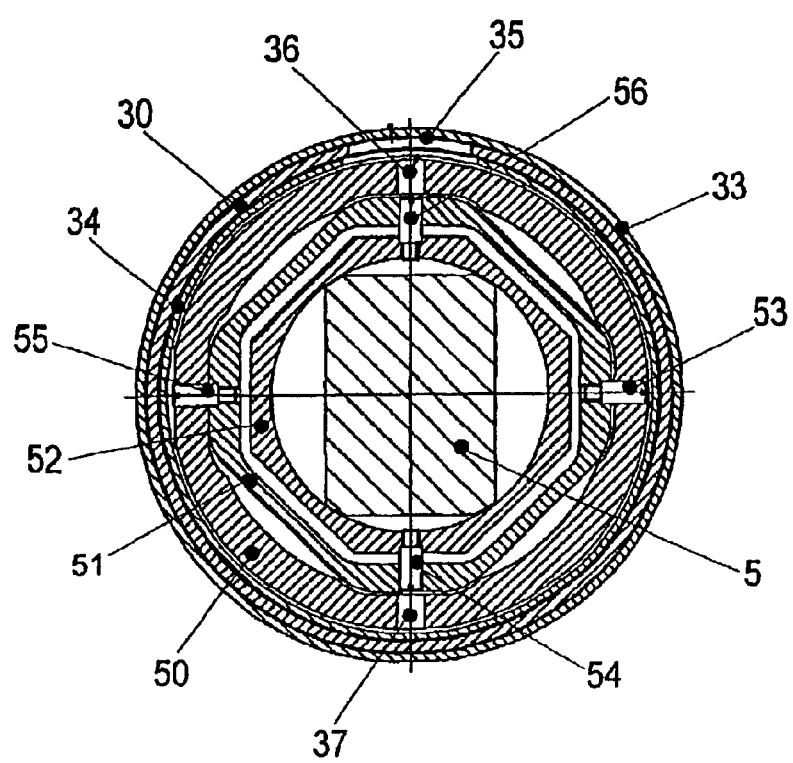
FIG. 5 shows a section through the image-rotating optical system according to FIG. 3 along the line V—V.

FIG. 4 shows in a section along the line IV—IV according to FIG. 3 the arrangement of the ring-shaped drive motor 8 inside the tube 30 of the image-rotating optical system 3, as well as a motor connection 80 of the ring-shaped drive motor 8 which is connected through a prism shaft 50 to the rotatable prism 5 (FIG. 5) and is supported relative to the tube 30 through a motor holder 81.

By using a ring-shaped drive motor 8 it is thereby ensured that no external eccentric forces are introduced into the image-rotating optical system 3 which could lead to a reduction in the optical performance of the image-rotating optical system 3. Through the rigid connection between the ring-shaped drive motor 8 and the rotatable prism 5 as well as through the fixed arrangement of the position sensor 9 in the tube of the image-rotating optical system 3 no mechanical play occurs in the drive so that a highly accurate adjusting of the horizon line can be achieved by means of the image-rotating optical system 3.

Since furthermore no mechanical gearing is required for transferring the rotational movement from the adjusting motor to the rotatable prism 5 a minimum noise level can be reached. Since the ring-shaped drive motor can be mounted without problem inside the tube 30 of the image-rotating optical system 3 the structural space required for the rotation of the rotatable prism 5 is minimal and clearly less than with external drives.

In order to be able to centre the rotatable prism 5 in an optimum manner it is suspended in three axes to form a cardan-type bearing. This cardan-type suspension enables the rotatable prism 5 to tilt vertically and horizontally and to be adjusted vertically in relation to the recording beam path, i.e. to undertake in addition to a tilting movement also a displacement movement in at least one axial direction—in the direction of the Y-axis according to FIG. 1. This cardan-type suspension of the rotatable prism 5 can be seen from the sectional view of FIG. 5 which shows a section through the image-rotating optical system 3 along the line V—V of FIG. 3.

The rotatable prism 5 is fixed in a prism chair 52 whose position can be changed relative to a prism holder 51 by means of two adjusting bolts 54, 56. The position of the prism holder 51 is in turn variable relative to a prism shaft 50 which is supported through a distance sleeve 34 relative to the tube 30 of the image-rotating optical system.

For tilting and displacing the rotatable prism 5 the tube 30 has an adjusting opening 35 and in the prism shaft 50 there are diametrically oppositely arranged openings 36, 37 which align with the adjusting slits of adjusting bolts 53, 54, 55, 56. The adjusting bolts 54, 56 arranged diametrically opposite one another between the prism holder 51 and the prism chair 52 carry out a horizontal tilting of the prism chair 52 and thus of the rotatable prism 5 as well as a height adjustment of the rotatable prism 5. The adjusting bolts 53, 55 which are likewise arranged diametrically opposite one another and perpendicular to the prism are disposed between the prism shaft 50 and the prism holder and cause a vertical tilting of the rotatable prism 5. A cover 38 forms the outer closure of the image-rotating optical system.

The invention is not restricted in design to the preferred embodiments indicated above but a number of variations are possible which make use of the solution illustrated in the drawings and description even in basically different designs. Thus the drive system for the image-rotating optical system illustrated in the embodiment described above is also suitable for undertaking other functions in optical systems of professional camera technology, for example for swivel and incline movements in snorkel systems.

What is claimed is:

1. An optical system for the rotation of images taken by a film camera about an optical axis, the system comprising:
   a device controlling the rotation of the images taken and having an adjusting motor and a position sensor which detects the rotation angle of the optical system; and
   a tube containing,
      a rotatably mounted optical element for rotating the images taken,
      an iris aperture, and
      a relay optic or double Gauss lens for converging optical beams of the images taken towards the iris aperture and diverging the optical beams towards a fixed prism;
   wherein the adjusting motor is mounted in the tube and comprises a ring-shaped drive motor mounted about the rotatably mounted optical element of the optical system for rotating the images taken, and wherein the position sensor detects a rotational angle of the rotatably mounted optical element and is fixed on the tube.

2. The optical system according to claim 1 wherein the recorded images continuously rotate about the optical axis.

3. The optical system according to claim 1 or 2 wherein the rotatably mounted optical element is displaceable in either or both the direction of the optical axis and a direction perpendicular thereto.

4. The optical system according to claim 1, wherein the rotatably mounted optical element comprises one of a rotatable prism and a rotatable mirror assembly.

5. The optical system according to claim 4 wherein the rotatable prism is a Schmidt Pechan prism.

6. The optical system according to claim 1 wherein at least one of a field lens, a field lens system, the rotatable prism, the rotatable mirror assembly, a transmission lens, a fixed prism and a mirror assembly are provided in the direction of a recording beam path.

7. The optical system according to claim 6 wherein the transmission lens comprises a relay optic or a double Gauss lens.

8. The optical system according to claim 1 wherein the optical system is mounted between a lens carrier of a camera housing and a recording lens of the film camera.

9. The optical system according to claim 1 comprising a front and rear fastening flange for connecting the optical system to a recording lens and to a lens carrier of a camera housing.

10. The optical system according to claim 1 wherein a rear fastening flange of the optical system is arranged so that in the optical system is connected to a lens carrier and a fixed prism is mounted at least in part inside a camera housing.

11. The optical system according to claim 1 wherein an iris aperture is mounted in the optical system between a transmission lens and a fixed prism and can be operated from a housing side of the optical system.

12. The optical system according to claim 1 further comprising an adjusting device which adjusts at least part of the optical elements of the optical system.

13. The optical system according to claim 12 wherein the device adjusting at least part of the optical elements of the optical system has means for correcting picture errors.

14. The optical system according to claim 1 wherein a field lens or a field lens system is arranged and fixed so that the field lens or at least a part of the field lens system can be exchanged.

15. The optical system according to claim 1 wherein the rotatably mounted optical element is suspended through a cardan fixing in a housing of the optical system and is adjustable in at least two planes.

16. An optical system for the rotation of images taken by a film camera about an optical axis, the system comprising:
- a tube containing a rotatably mounted optical element for rotating the images taken, wherein the rotatably mounted optical element is fixed in a prism chair which is mounted in a prism holder to swivel about a first axis, and wherein the prism holder is mounted in a prism shaft connected to a ring-shaped drive motor to swivel about a second axis;
- a device controlling the rotation of the images taken and having an adjusting motor and a position sensor which detects the rotation angle of the optical system wherein the adjusting motor is mounted in the tube and comprises a ring-shaped drive motor mounted about the rotatably mounted optical element of the optical system for rotating the images taken, and wherein the position sensor detects a rotational angle of the rotatably mounted optical element and is fixed on the tube.

17. The optical system according to claim 16 wherein the prism shaft is mounted inside a distance sleeve for the bearing of the rotatably mounted optical element, wherein the distance sleeve is mounted inside a tube and wherein the tube is enclosed by a cover of the housing of the optical system.

18. The optical system according to claim 16 or 17, wherein the first and second axis are defined by bolts wherein the bolts defining the first axis are arranged diametrically opposite one another, are mounted rotatably in the prism shaft and are connected to the prism holder and wherein the bolts defining the second axis are arranged diametrically relative to each other and perpendicular to the bolts defining the first axis and are mounted in the prism holder and are connected to the prism chair.

19. The optical system according to claim 18, wherein an opening for adjusting the bolts is provided in the housing of the optical system or in the tube and in the prism shaft.

20. The optical system according to claim 1 or 16 wherein a housing of the optical system is connected through a connecting element to iris rods fixed on a camera housing of the film camera.

21. The optical system according to claim 20 wherein the connecting element comprises a control electronics unit connected to the position sensor and the ring-shaped drive motor.

22. The optical system according to claim 16 wherein the second axis is perpendicular to the first axis.

23. The optical system according to claim 16 wherein the rotatably mounted optical element is suspended through a cardan fixing in a housing of the optical system and is adjustable in at least two planes.

24. An optical system for the rotation of images taken by a film camera about an optical axis, the system comprising:
- a film camera having a film transport mechanism for intermittently moving the film;
- a tube containing an optical element for rotating the images taken; and
- a device controlling the rotation of the images taken and having an adjusting motor and a position sensor which detects the rotation angle of the optical system, said adjusting motor being mounted in the tube and comprising a ring-shaped drive motor mounted about said optical element for rotating the images taken,
- wherein said position sensor detects a rotational angle of the optical element and is fixed on the tube, and wherein rotation of the optical system is synchronized with the film transport.

25. The optical system according to claim 24 wherein the rotation of the optical system takes place in a transport phase of the moving film.

26. The optical system according to claim 24 or 25 wherein during a transport phase of the moving film a release signal is sent to a control electronics unit to control the adjusting motor.

* * * * *